US008326317B2

(12) United States Patent
Alles et al.

(10) Patent No.: US 8,326,317 B2
(45) Date of Patent: Dec. 4, 2012

(54) SYSTEM AND METHOD TO OBTAIN CALIBRATION DATA USING ESTIMATION TECHNIQUES

(75) Inventors: Martin Alles, Vienna, VA (US); John Carlson, Dulles, VA (US); George Maher, Herndon, VA (US); Selcuk Mazlum, Leesburg, VA (US)

(73) Assignee: Andrew LLC, Hickory, NC (US)

( * ) Notice: Subject to any disclaimer, the term of this patent is extended or adjusted under 35 U.S.C. 154(b) by 1339 days.

(21) Appl. No.: 12/026,364

(22) Filed: Feb. 5, 2008

(65) Prior Publication Data

US 2008/0188245 A1 Aug. 7, 2008

Related U.S. Application Data

(60) Provisional application No. 60/899,379, filed on Feb. 5, 2007.

(51) Int. Cl.
H04W 24/00 (2009.01)
(52) U.S. Cl. .................... 455/456.1; 455/425
(58) Field of Classification Search .... 455/456.1–456.6, 455/404.2, 425; 342/357.2, 357.25, 357.62, 342/357.63; 702/85, 94, 95; 340/539.13, 340/988, 989, 456.1, 8.1; 701/214
See application file for complete search history.

(56) References Cited

U.S. PATENT DOCUMENTS

| 3,150,372 | A | 9/1964 | Groth, Jr. |
| 3,659,085 | A | 4/1972 | Potter et al. |
| 4,728,959 | A | 3/1988 | Maloney |
| 4,814,751 | A | 3/1989 | Hawkins |
| 4,845,504 | A | 7/1989 | Roberts et al. |
| 4,891,650 | A | 1/1990 | Sheffer |
| 5,056,106 | A | 10/1991 | Wang |
| 5,218,618 | A | 6/1993 | Sagey |
| 5,317,323 | A | 5/1994 | Kennedy et al. |
| 5,327,144 | A | 7/1994 | Stilp et al. |
| 5,365,544 | A | 11/1994 | Schilling |
| 5,372,144 | A | 12/1994 | Mortier et al. |
| 5,404,376 | A | 4/1995 | Dent |

(Continued)

FOREIGN PATENT DOCUMENTS

EP 1471688 A2 10/2004

(Continued)

OTHER PUBLICATIONS

Amir Leshem, Mati Wax, "Array Calibration in the Presence of Multipath," IEEE Transactions on Signal Processing, vol. 48, No. 1, pp. 53-59, Jan. 2000.

(Continued)

Primary Examiner — Melody Mehrpour
Assistant Examiner — Emem Stephen
(74) Attorney, Agent, or Firm — Duane Morris LLP

(57) ABSTRACT

A system and method of determining calibration data at non-calibrated location points is disclosed. A mobile station may be geo-located at most locations, if not all locations, within communication range of one or more serving and/or neighboring base stations of a mobile network. Calibration data may be collected and stored in memory via a data collection procedure. Known calibration data for locations proximate to the mobile station may be necessary when attempting to geo-locate the mobile station. A geographical region may be calibrated via a standard calibration data collection procedure, however, various obstacles, such as, buildings, mountains, ponds etc. may inevitably create deficiencies in the calibration data for one or more areas of the region. Certain techniques may be applied to estimate the calibration data of areas that have not been properly calibrated.

17 Claims, 7 Drawing Sheets

U.S. PATENT DOCUMENTS

| | | |
|---|---|---|
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A | 11/1999 | Yost |
| 6,014,102 A | 1/2000 | Mitzlaff et al. |
| 6,047,192 A | 4/2000 | Maloney |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,233,459 B1 | 5/2001 | Sullivan et al. |
| 6,246,884 B1 | 6/2001 | Karmi et al. |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang |
| 6,640,106 B2 | 10/2003 | Gutowski et al. |
| 6,646,604 B2 | 11/2003 | Anderson |
| 6,661,379 B2 | 12/2003 | Stilp et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,871,077 B2 | 3/2005 | Kennedy |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,952,158 B2 | 10/2005 | Kennedy, Jr. |
| 6,987,979 B2 | 1/2006 | Carlsson |
| 6,996,392 B2 | 2/2006 | Anderson |
| 7,023,383 B2 | 4/2006 | Stilp et al. |
| 7,167,713 B2 | 1/2007 | Anderson |
| 7,271,765 B2 | 9/2007 | Stilp et al. |
| 7,340,259 B2 | 3/2008 | Maloney |
| 7,427,952 B2 | 9/2008 | Bull et al. |
| 7,440,762 B2 | 10/2008 | Maloney et al. |
| 7,593,738 B2 | 9/2009 | Anderson |
| 2002/0172223 A1 | 11/2002 | Stilp et al. |
| 2003/0064734 A1 | 4/2003 | Stilp et al. |
| 2003/0139188 A1 | 7/2003 | Chen et al. |
| 2003/0190919 A1 | 10/2003 | Niemenmaa |
| 2003/0203738 A1 | 10/2003 | Brown et al. |
| 2004/0043775 A1 | 3/2004 | Kennedy, Jr. et al. |
| 2004/0132466 A1 | 7/2004 | Kennedy, Jr. et al. |
| 2004/0203921 A1 | 10/2004 | Bromhead et al. |
| 2004/0218664 A1 | 11/2004 | Kennedy, Jr. et al. |
| 2004/0252752 A1 | 12/2004 | Kennedy, Jr. et al. |
| 2005/0040968 A1 | 2/2005 | Damarla et al. |
| 2005/0058182 A1 | 3/2005 | Kennedy, Jr. et al. |
| 2005/0078033 A1 | 4/2005 | Tamaki et al. |
| 2005/0136945 A1 | 6/2005 | Kennedy, Jr. et al. |
| 2005/0164712 A1 | 7/2005 | Kennedy, Jr. et al. |
| 2005/0176442 A1 | 8/2005 | Ju et al. |
| 2005/0192026 A1 | 9/2005 | Carlson et al. |
| 2005/0243936 A1 | 11/2005 | Agrawala et al. |
| 2005/0266855 A1 | 12/2005 | Zeng et al. |
| 2006/0003695 A1 | 1/2006 | Kennedy, Jr. et al. |
| 2006/0003775 A1 | 1/2006 | Bull et al. |
| 2006/0030333 A1 | 2/2006 | Ward et al. |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2006/0240843 A1 | 10/2006 | Spain et al. |
| 2007/0087689 A1 | 4/2007 | Kennedy, Jr. et al. |
| 2007/0111746 A1 | 5/2007 | Anderson et al. |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |
| 2008/0160953 A1 | 7/2008 | Mia et al. |
| 2008/0161015 A1 | 7/2008 | Maloney et al. |
| 2008/0248811 A1 | 10/2008 | Maloney et al. |
| 2008/0261611 A1 | 10/2008 | Mia et al. |
| 2008/0261612 A1 | 10/2008 | Mia et al. |
| 2008/0261613 A1 | 10/2008 | Anderson et al. |
| 2008/0261614 A1 | 10/2008 | Mia et al. |
| 2009/0005061 A1 | 1/2009 | Ward et al. |

FOREIGN PATENT DOCUMENTS

| | | |
|---|---|---|
| JP | 06-347529 | 12/1994 |
| WO | 0034799 A1 | 6/2000 |
| WO | 02/082832 A2 | 10/2002 |
| WO | 2006088472 A1 | 8/2006 |

OTHER PUBLICATIONS

Xin Wang, Zongxin Wang and Bob O'Dea, "A TOA-Based Location Algorithm Reducing the Errors Due to Non-Line-of-Sight (NLOS) Propagation," IEEE Trans. Vehicular Technology, vol. 52, No. 1, Jan. 2003, pp. 112-116.

M. Vanderveen, C. Papadias, A. Paulraj, "Joint Angle and Delay Estimation (JADE) for Multipath Signals Arriving at an Antenna Array," IEEE Communications Letters, vol. 1, No. 1, Jan. 1997, pp. 12-14.

R. Schmidt, "Multiple Emitter Location and Signal Parameter Estimation," IEEE Transactions on Antennas and Propagation, vol. AP-34, No. 3, Mar. 1986, pp. 276-280.

Y. Chen, M. Zoltowski, "Joint Angle and Delay Estimation for DS-CDMA with Application to Reduced Dimension Space-Time Rake Receivers," Mar. 1999, pp. 2933-2936.

A.J. Paulraj, C.B. Papadias, "Space-Time Processing for Wireless Communications", IEEE Signal Processing Magazine, vol. 11, Nov. 1997, pp. 49-83.

C.B. Papadias, A.J. Paulraj , "Space-Time Signal Processing for Wireless Communications: A Survey", Information Systems Laboratory, Stanford University.

M. Haardt, C. Brunner, J. Nossek, "Joint Estimation of 2-D Arrival Angles, Propagation Delays, and Doppler Frequencies in Wireless Communications," Proc. IEEE Digital Signal Processing Workshop, vol. 1, pp. 1-4, Bryce Canyon National Park, Utah, Aug. 1998.

Mati Wax, "Position Location from Sensors with Position Uncertainty," IEEE Transactions Aerospace and Electronic Systems, vol. AES-19, No. 5, Sep. 1983, pp. 658-662.

D.J. Torrieri, "Statistical Theory of Passive Location Systems", IEEE Transactions Aerospace and Electronic Systems, vol. AES-20, No. 2, Mar. 1984, pp. 183-198.

Y.T. Chan and K.C. Ho, "A Simple and Efficient Estimator for Hyperbolic Location", IEEE Transactions Signal Processing, vol. 42, No. 8, Aug. 1994, pp. 1905-1915.

W.H. Foy, "Position-Location Solutions by Taylor-Series Estimation", IEEE Transactions Aerospace and Electronic Systems, vol. AES-12, No. 2, Mar. 1976, pp. 187-194.

R.G. Stansfield, "Statistical Theory of DF Fixing", Journal IEE 94, Part III A, Oct. 1947, pp. 762-770.

M.P. Wylie and J. Holtzman, "The Non-Line of Sight Problem in Mobile Location Estimation", Process IEEE 5th International Conference on Universal Personal Communications, vol. 2, Oct. 1996, pp. 827-831.

L.Cong and W. Zhuang, "Non-Line-of-Sight Error Mitigation in TDOA Mobile Location", Process IEEE Global Telecommunications Conference, vol. 1, Sep. 2001, pp. 680-684.

P.C. Chen, "A Non-Line-of-Sight Error Mitigation Algorithm in Location Estimation", Process IEEE Conference on Wireless Communications Networking, vol. 1, 1999, pp. 316-320.

N. J. Thomas, D.G.M. Cruickshank and D.I. Laurenson, "Performance of a TDOA-AOA Hybrid Mobile Location System", 3G Mobile Communication Technologies, Conference Publication No. 477, Mar. 2001, pp. 216-220.

J. Caffery, Jr., and G. Stuber, "Subscriber Location in CDMA Cellular Networks," IEEE Transactions on Vehicular Technology, vol. 47, No. 2, May 1998, pp. 406-416.

J. Caffery. Jr., "A New Approach to the Geometry of TOA Location," IEEE, VTC 2000, pp. 1943-1949.

M.Silventoinen and T. Rantalainen, "Mobile Station Emergency Locating in GSM", Process IEEE International Conference, Personal Wireless Communications, vol. 1, 1996, pp. 232-238.

Y. Zhao, "Standardization of Mobile Phone Positioning for 3G Systems," IEEE Communications Magazine, Jul. 2002, pp. 108-116.

C. Drane, M. MacNaughtan, and C. Scott, "Positioning GSM Telephones," IEEE Communications Magazine, Apr. 1998, pp. 46-54, 59.

J. Caffery, Jr., and G. Stuber, "Overview of Radiolocation in CDMA Cellular Systems," IEEE Communications Magazine, Apr. 1998, pp. 38-45.

T. Rappaport, J.H. Reed and B.D. Woerner, "Position Location Using Wireless Communications on Highways of the Future," IEEE Communications Magazine, Oct. 1996, pp. 33-41.

I. Ziskind and M. Wax, "Maximum Likelihood Localization of Multiple Sources by Alternating Projection," IEEE Transactions on Acoustics, Speech, and Signal Porcessing, vol. 36, No. 10, pp. 1553-1560, Oct. 1988.

G.W.K. Colman, "A Comparison of the Accuracy of TDOA and TOA Location Algorithms with Equivalent Receiver Geometry," Defence R&D Canada Technical Memorandum (DREO TM 2001-063), Oct. 2001, pp. 1-53.

L. Mailaender, "On the Geolocation Bounds for Round-Trip Time-of-Arrival and All Non-Line-of-Sight Channels", EURASIP Journal on Advances in Signal Processing, vol. 2008, pp. 1-10.

N. Agarwal, L. Chaudran-Wadi, and V. Apte, "Capacity Analysis of the GSM Short Message Service", Indian Institute of Technology Bombay, www.cse.iitb.ac.in/~varsha/allpapers/wireless/ncc03cam.pdf, 2004, pp. 1-5.

J.D. Bard, and F.M. Ham, "Time Difference of Arrival Dilution of Precision and Applications," IEEE Transactions on Signal Processing, vol. 47, No. 2, pp. 521-523, Feb. 1999.

K.C. Ho, and W. Xu, "An Accurate Algebraic Solution for Moving Source Location Using TDOA and FDOA Measurements", IEEE Transactions on Signal Processing, vol. 52, No. 9, Sep. 2004, pp. 2453-2463.

C.H. Knapp and G.C. Carter, "The Generalized Correlation Method for Estimation of Time Delay," IEEE Transactions on Acoustics, Speech, and Signal Processing, vol. ASSP-24, No. 4, Aug. 1976, pp. 320-327.

M. Rahnema, "Overview of the GSM System and Protocol Architecture," IEEE Communications Magazine, Apr. 1993, pp. 92-100.

S. Stein, "Algorithms for Ambiguity Function Processing," IEEE Transactions on Acoustics, Speech, and Signal Processing, vol. ASSP-29, No. 3, Jun. 1981, pp. 588-599.

M. Vanderveen, C.B. Papadias, and A. Paulraj, "Joint Angle and Delay Estimation (JADE) for Multipath Signals Arriving at an Antenna Array", IEEE Communications Letters, vol. 1, No. 1, Jan. 1997, pp. 12-14.

M. Wax and I. Ziskind, "On Unique Localization of Multiple Sources by Passive Sensor Arrays," IEEE Transactions on Acoustics, Speech, and Signal Processing, vol. 37, No. 7, Jul. 1989, pp. 996-1000.

B. Yang, "Projection Approximation Subspace Tracking," IEEE Transactions on Signal Processing, vol. 43, No. 1, Jan. 1995, pp. 95-107.

SYSTEM AND METHOD TO OBTAIN CALIBRATION DATA USING ESTIMATION TECHNIQUES

CROSS REFERENCES

The present application is related to Provisional Application No. 60/899,379 entitled "Mobile Location Using Network Measurement Reports" filed on Feb. 5, 2007, which is hereby incorporated by reference in its entirety.

BACKGROUND

The use of wireless communication devices such as telephones, pagers, personal digital assistants, laptop computers, etc., hereinafter referred to collectively as "mobile appliances" or "mobiles stations" has become prevalent in today's society. In recent years, at the urging of public safety groups, there has been increased interest in technology which can determine the geographic position or "geo-locate" a mobile station in certain circumstances.

Determining the location of a mobile station may require one or more types of calibration data associated with the mobile station (e.g., signal strength, round trip time, time difference of arrival (TDOA), etc.). Calibration data is typically collected in an outdoor environment. The primary reason for collecting calibration data outdoors is the greater ease of collecting data via automated calibration collection procedures or via manual collection procedures along roads. It is time-consuming to perform calibration procedures at geographical locations that are likely to include mobile stations but are not accessible by roads, such as, indoor locations, pathways, parks, etc.

Intentionally avoiding calibration data collection procedures in areas that are not accessible by motorized vehicles would simplify the calibration data collection procedure. If, however, there is any probability that a mobile station is likely to be located in these non-calibrated areas, then failing to obtain certain calibration data may be detrimental to locating the mobile station.

Obtaining calibration data in areas that are not accessible by vehicles and/or other types of automated data collection devices without performing manual calibration procedures would increase productivity and reduce associated costs.

One embodiment of the present subject matter is a method to determine calibration data at a candidate location by determining the candidate location in the non-calibrated sub-region to measure calibration data and obtaining calibration data for a previously calibrated geographical region within communication range of the candidate location. The method may further determine a function to represent at least a portion of the calibration data of the calibrated geographical region, and estimate the calibration data at the candidate location based on the function.

Another embodiment of the present subject matter is a method to determine calibration data at a candidate location by determining the candidate location in the non-calibrated sub-region to measure calibration data and determining a varying power function of signal power received from at least one neighboring base station to represent calibration data of at least a portion of a calibrated geographical region adjacent to the non-calibrated region. The method may further estimate the calibration data at the candidate location based on the function.

Another embodiment of the present subject matter is a method to determine calibration data at a candidate location by determining the candidate location in the non-calibrated sub-region to measure calibration data and determining a varying power function of signal powers received from a plurality of neighboring base stations to represent calibration data of at least a portion of a calibrated geographical region adjacent to the non-calibrated sub-region. The method may further determine at least one lowest signal power level of the plurality of signal power levels received, omit the signal power of the base station that transmitted the lowest signal power level from the varying power function, and estimate the calibration data at the candidate location based on the function.

Yet another embodiment of the present subject matter is a method to determine calibration data at a candidate location by determining the candidate location in the non-calibrated sub-region to measure calibration data and providing calibration data for a calibrated geographical region within communication range of the candidate location. The method may also determine a first function to represent at least a first portion of the calibration data of the calibrated geographical region, determine a second function to represent at least a second portion of the calibration data of the calibrated geographical region, where the second portion may be different from the first portion, and estimate the calibration data at the candidate location based on the first and second functions.

Still yet another embodiment of the present subject matter is a method to implement a system to determine calibration data in a non-calibrated sub-region including a calibration data collection device to collect and store calibration data within a first portion of a geographical region. A computing device may then locate a candidate location within a non-calibrated portion of the region, select a previously calibrated geographical region within communication range of the candidate location, determine a function to represent at least a portion of the calibration data of the calibrated geographical region, and estimate the calibration data at the candidate location based on the function.

These and other advantages of the disclosed subject matter over the prior art will be readily apparent to one skilled in the art to which the disclosure pertains from a perusal of the claims, the appended drawings, and the following detailed description of the preferred embodiments.

DETAILED DESCRIPTION

Calibration data samples obtained in a given region may be used to represent general relationships between calibrated areas and nearby areas that have not been calibrated, and in turn may be used to locate a mobile station. A method of utilizing calibration data samples to represent non-calibrated areas is described herein.

Calibration data may include a set of location points (ground truths) obtained by any of a variety of data collection devices and techniques. Some exemplary collection devices may include a GPS receiver to receive satellite location signals and/or a terrestrial geo-location device that receives and measures signal strengths transmitted from neighboring base stations or other wireless signaling devices. Assuming a set of location points have been obtained by one or more of these types of data collection techniques, the location point data may be used to locate the mobile station by using a geo-location algorithm.

Each calibration point measured may be included in a network measurement report (NMR) used to represent signal characteristics received or generated at that particular location point. A NMR may be represented as a data vector containing measured signal power level parameters (e.g., P1, P2, P3) and a timing advance parameter TA1. An exemplary NMR data vector may be represented as NMR_data_vector= [P1, P2, P3, TA1]. A NMR data vector may contain any amount or type of parameters, and may be generated by a mobile station or a calibration data collection device. The NMR data may be transmitted to a position determining equipment (PDE) device (not shown) to locate a mobile station.

The value of the timing advance (TA) parameter corresponds to the length of time a signal from a MS takes to reach a particular BS. A MS may be configured to transmit data signals at specific timeslot intervals depending on the type of wireless communication protocol employed (e.g., TDMA, GSM, 3GPP, etc.). Using the speed of light ($c=3*10^8$ m/s) as a reference velocity for the radio waves, the TA parameter may be increased or decreased depending on the distance between the MS and the BS. The TA parameter may need to be adjusted periodically as the distance from the MS to the BS changes.

Figure 1:
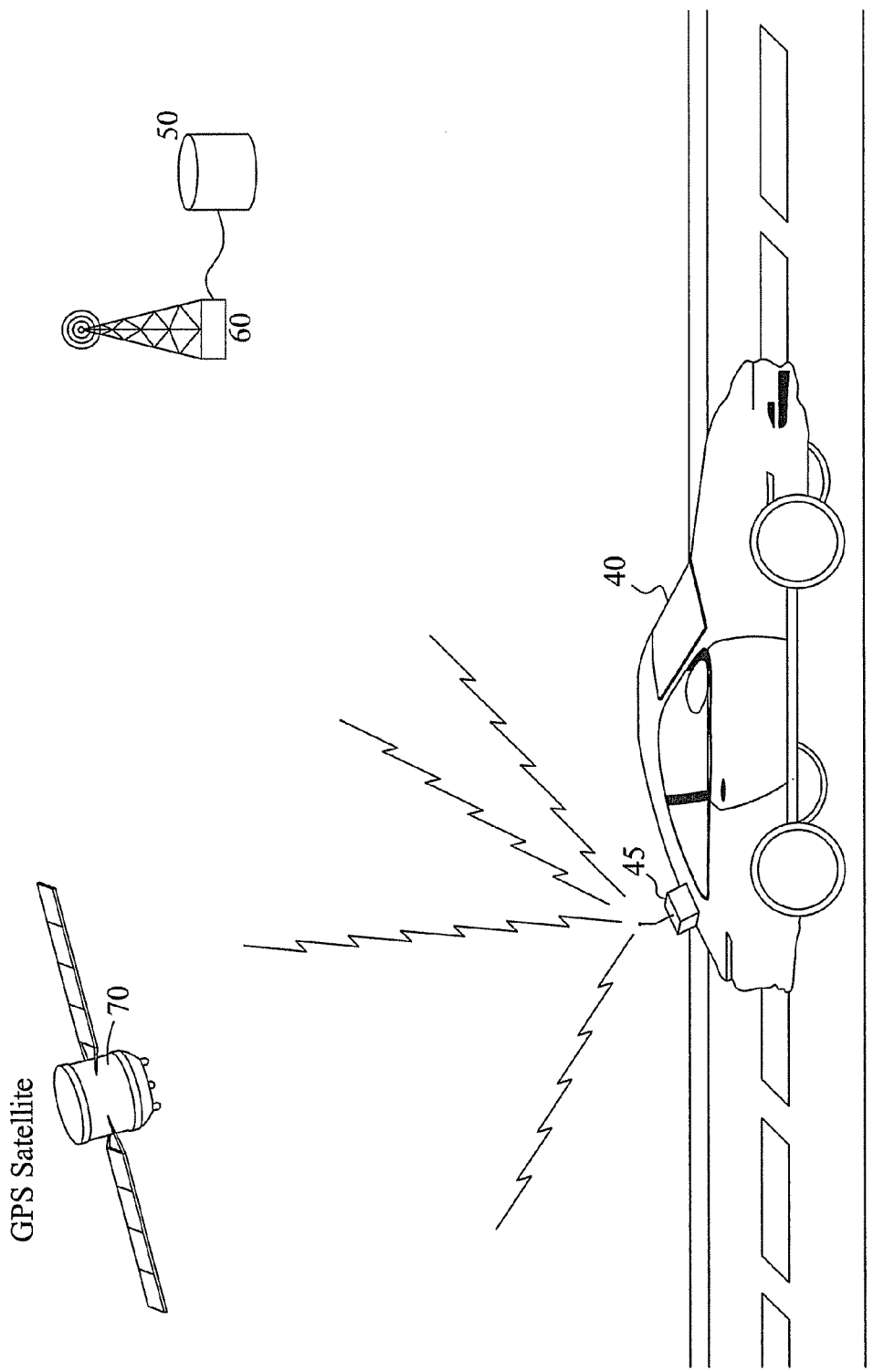
FIG. 1 illustrates an exemplary calibration data collection system.

One way to obtain calibration data and generate corresponding NMRs is to perform data collection via a drive test vehicle. Referring to FIG. 1, a drive test vehicle 40 operates by installing a calibration data collection device 45 inside/outside the vehicle 40 and driving on streets to collect calibration data. It may be desirable to collect calibration data in areas likely to include a mobile station, which may be most places within communication range of the neighboring and or serving base station(s) 60. A GPS satellite 70 may provide a source of location data to assist in the calibration data collection procedure. Once calibration data has been collected, it may be forwarded to a memory location and/or database 50 for storage and retrieval for subsequent calculations, or it may be stored locally at the data collection device 45.

The drive test vehicle 40 may be any type of vehicle that is capable of traveling in areas where calibration procedures are conducted. The drive test vehicle 40 may be incapable of measuring and/or collecting calibration data in every possible candidate location that a mobile station could be located. For example, locations such as buildings, pedestrian walkways, and in general any area not accessible to vehicular traffic may fall outside of the navigable region of a drive test vehicle 40. Although, some of these inaccessible regions may be later calibrated manually, the effort required to perform manual calibration may be arduous and costly.

Figure 2:
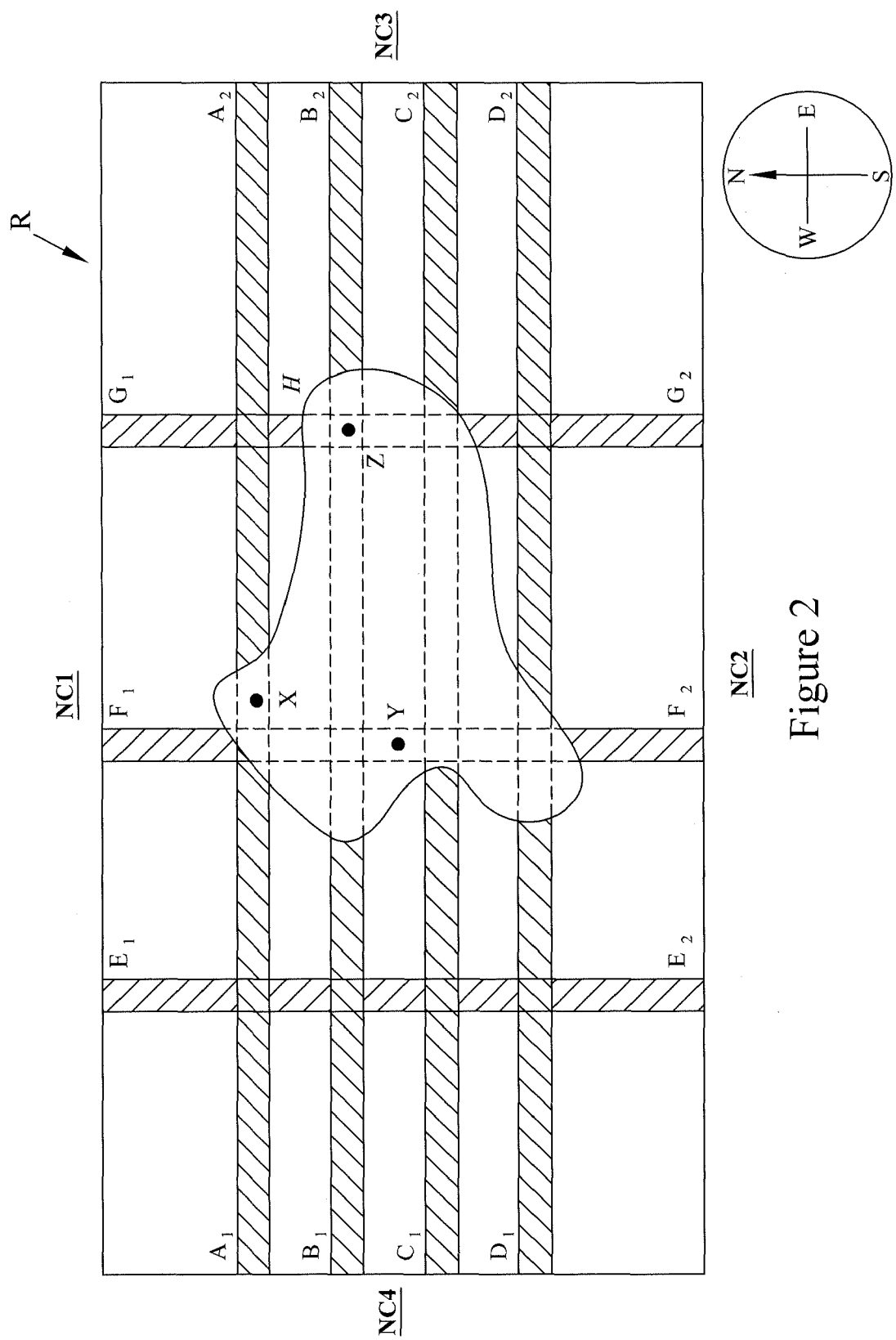
FIG. 2 illustrates an exemplary region having calibrated and non-calibrated areas.

Referring to FIG. 2, as a result of encountering areas where calibration data could not be obtained by a drive test vehicle 40, the resulting calibration data for a given region (R) may include non-calibrated areas or holes (H). In general, most areas in a given region (R) that are likely to include mobile stations are accessible by vehicular traffic, however, a hole (H) in the region (R) may remain viable locations for a mobile station. The hole (H) may represent a building, mountain, lake, etc., or any area that has not been calibrated. In order to obtain the missing calibration data (i.e., "fill the hole"), calibration data from other nearby locations may be useful when attempting to calculate the missing calibration data.

The hole (H) is located in a calibration region (R) having a respective network of streets that either pass through and/or are near the hole (H). The street may be designated by a "1" if it is located on a first side of the hole (H) and a "2" if it is located on an opposite side of the hole (H) (e.g., A1-A2, B1-B2, C1-C2, D1-D2, E1-E2, F1-F2 and G1-G2). As a non-limiting example of a wireless communications system, consider that there are 4 NCs (NC 1, NC2, NC3 and NC4) within range of the calibration region (R) and NC1 is located on the north side of the hole, NC2 on the south side, NC3 on the east side and NC4 is located on the west side of the hole.

Figure 3:
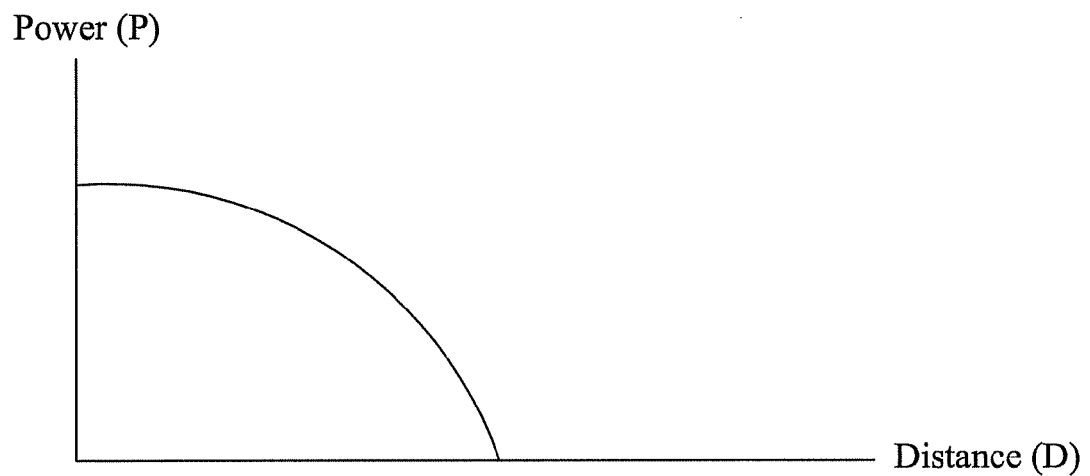
FIG. 3 illustrates an exemplary graph of signal power over distance.

Signal power (P) of the serving and/or neighboring cell (NC) base stations measured at particular locations in the region (R) may be modeled by a varying power function which decays as a function of distance. Referring to FIG. 3, the variation of signal power traveling along streets away from a particular base station may be observed as a relatively smooth curve. Modeling signal power along streets may exhibit fairly uniform continuity on average. The signal may experience large fluctuations due to blockage by buildings, multipath, fading, etc., but the average signal power over a distance (D) can be characterized as being a relatively smooth curve, as illustrated in FIG. 3.

The smooth curve model of the average signal power measured along streets may be used to fill the hole (H) in the calibration data region (R). Assume that it is desired to determine the NMR calibration data that would exist at points X, Y and Z, located in the hole (H) in FIG. 1. For point X, the available signal power from signals transmitted from NC 1 may be most accurate as measured outside the hole H and along the street A1-A2.

A function/curve may be estimated to provide a mathematical model of the signal power for NC1 along street A1-A2 in a north to south direction. Determining a curve that appropriately fits the calibration data of NC1 along street A1-A2 may be accomplished by a number of different curve-fitting techniques. Some example curve-fitting techniques that may be used include, but are not limited to, interpolation between individual samples, extrapolation, curve-fitting for a range of samples, linear regression, polynomial curve fitting, and a least squares approach. The function/curve generated may represent the signal power variation of NC1 over a distance and along the direction A1-A2. Similarly, the signal power of any of the available NCs (e.g., NC1-NC4) could be used to determine the function used to estimate the calibration data at point X.

After a curve function is generated based on the known data of NC1 along street A1-A2, it may be possible to estimate the expected value of the signal power of NC1 at point X based on the curve function. X is located approximately mid-way between the boundaries of the hole H along the west-east direction of A1-A2. The location of X may be near the extremity of the intended coverage of NC4, which covers the west side of region R. In a first scenario, it may be assumed that the NMR data at point X will not be accurately measured by a function that relies on the signal power of NC4. To compensate for the potentially erroneous data provided by NC4, it may be best to implement another hypothesis based one or more of the other NCs (e.g., NC1, NC2 and/or NC3).

Figure 4:
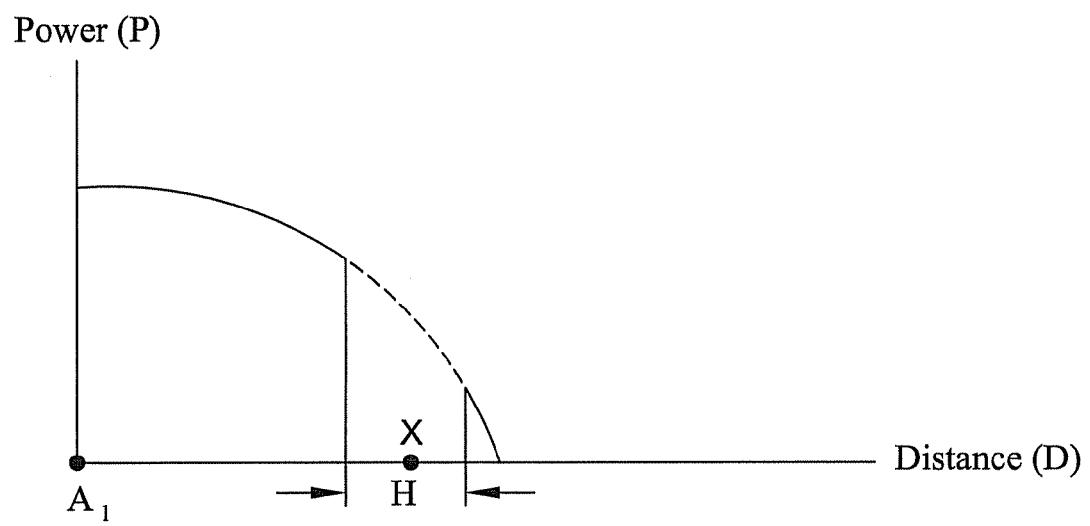
FIG. 4 illustrates another exemplary graph of signal power over distance.

Another example of the present subject matter for measuring the calibration data at point X may include using the power signals of NC4, in which case a function may be used to represent the signal power level of NC4 moving east to west along A1-A2 through the region R and past the hole H. By using, for example, interpolation, the unknown data at points in the hole H along the direction A1-A2 may be estimated by the function based on the signal power of NC4. Similarly, if the area of the hole H were to extend beyond the known data points, then extrapolation may be used to estimate the data of the hole H. FIG. 4 illustrates an exemplary function used to represent the signal power of NC4. Interpolation may be used to estimate the unknown data and fill in the portion of the curve (dotted line) located in the hole area H. Once the unknown data has been estimated, the data may be used to locate a mobile station located in the hole H using the point X as a reference.

As another non-limiting example, the power signals of NC4 may be excluded, and the value of NC4 may be absent (i.e., NC4=0) in the NMR generated at point X. Assuming the power signals of NC1-NC3 were used instead, the NMR report generated would not include NC4, but may contain estimated data based on functions used to represent the other available NCs (i.e., [NC1, NC2, NC3, NC4]=[P1, P2, P3, 0]). Of course, other combinations of NC(s) signal data may be used to determine the calibration data at point X. Ideally, the calibration data at point X would be estimated using all of the available NCs (e.g., NC1-NC4) to obtain the estimated values at point X.

In yet another non-limiting example, it may be desirable to obtain the NMR data at point Y. In this case, it may be prudent to use the available data for NC1 outside the hole H and along the street F1-F2. A function/curve may be determined to represent the signal power of NC1 over the distance along the direction F1-F2 from north to south. Similarly, estimating the calibration data at point Y may be conducted by including the signals obtained from NC2-NC4. Another method may proceed with estimating the calibration data at point Y via NC4 and omitting any estimation efforts from NC3 (the farthest NC from point Y) because Y is located somewhat closer to NC4 on the west side than NC3 on the east side of the region R.

In a further non-limiting example, it may be desirable to obtain the NMR data at point Z. Since Z is at the intersection of two streets (or the hypothetical extension of two streets since there may not actually be such a street within the hole H) there may be added leverage in estimating the calibration data at that point. The same analysis used in previous examples applies (i.e., estimating the calibration data based on NC1, NC2, NC3 and/or NC4); however, in this scenario two function/curves may be generated based on B1-B2 and G1-G2. Two functions may be combined to form a joint estimate of the NC power values at point Z. Since Z is closer to the eastern border of the hole, it may be prudent to disregard NC4 when estimating the calibration data at point Z.

The NMRs at every point of interest within the hole H may be estimated, especially, in circumstances where such points are located on extensions of streets. Points that do not fall on hypothetical extensions of streets may be estimated by interpolating between adjacent points that are located on the hypothetical extensions of streets. For example, two or more points on separate streets may be estimated using a curve fitting function described above, and then combined in an interpolation function to estimate the value of a target point located therebetween.

Figure 5:
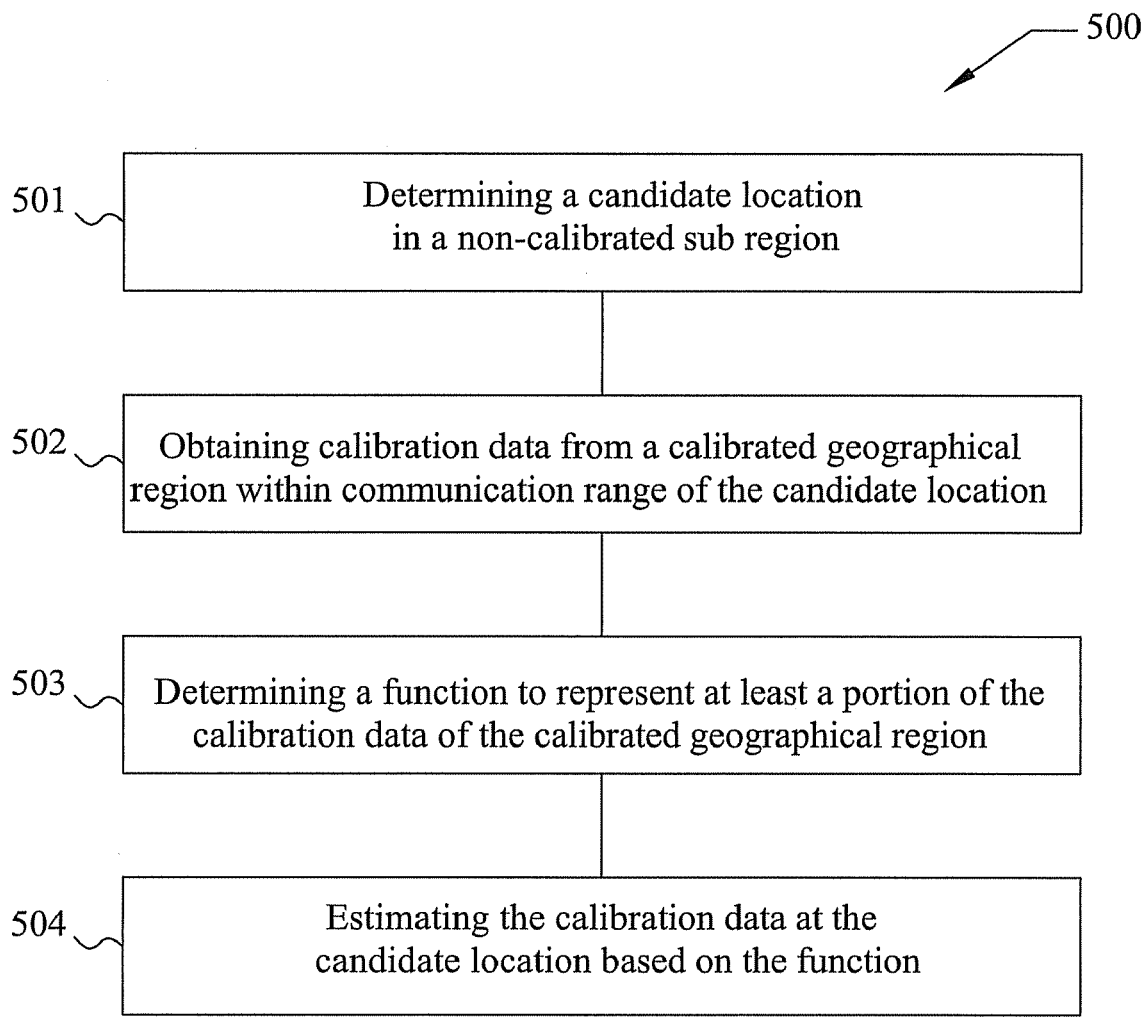
FIG. 5 illustrates a flow diagram according to an exemplary embodiment.

FIG. 5 illustrates a flow diagram 500 of a process that may be used to determine the calibration data at a candidate location. The candidate location may be located in a hole (H) and the calibration data at the candidate location may be unknown. A candidate location in a non-calibrated region may be selected (operation 501). A previously calibrated region may be selected and a function may be determined to represent at least a portion of the calibration data in the calibration region (operations 502 and 503). The calibration data at the candidate location may then be estimated based on the estimated function (operation 504).

Figure 6:
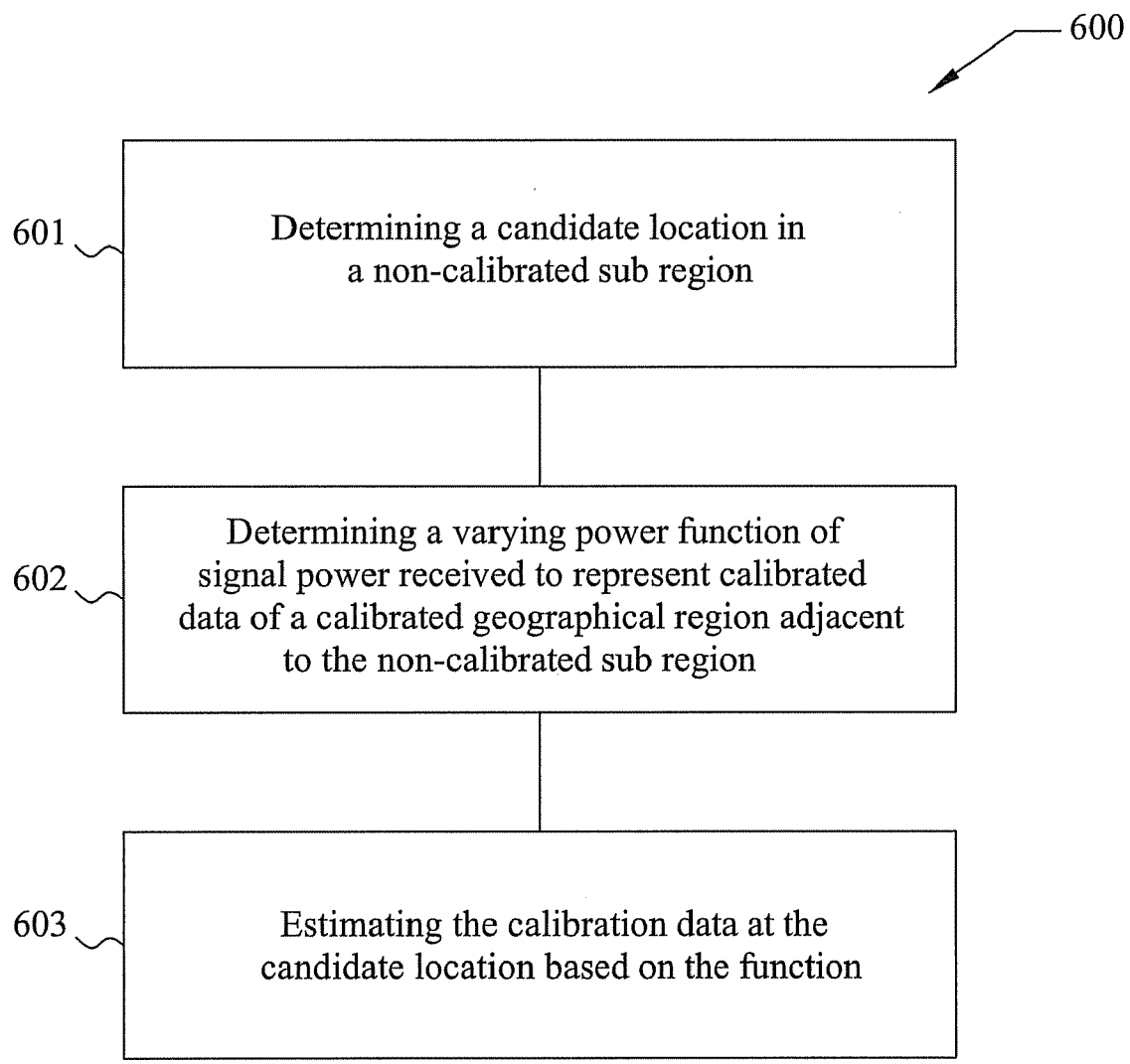
FIG. 6 illustrates a flow diagram according to another exemplary embodiment.

FIG. 6 illustrates a flow diagram 600 of another process that may be used to determine the calibration data at a candidate location. A candidate location in a non-calibrated region may be selected (operation 601). A varying power function may be determined based on signal power received from one or more NC base stations at a location in the calibrated region (operation 602). The calibration data at the candidate location may then be estimated based on the estimated function (operation 603).

Figure 7:
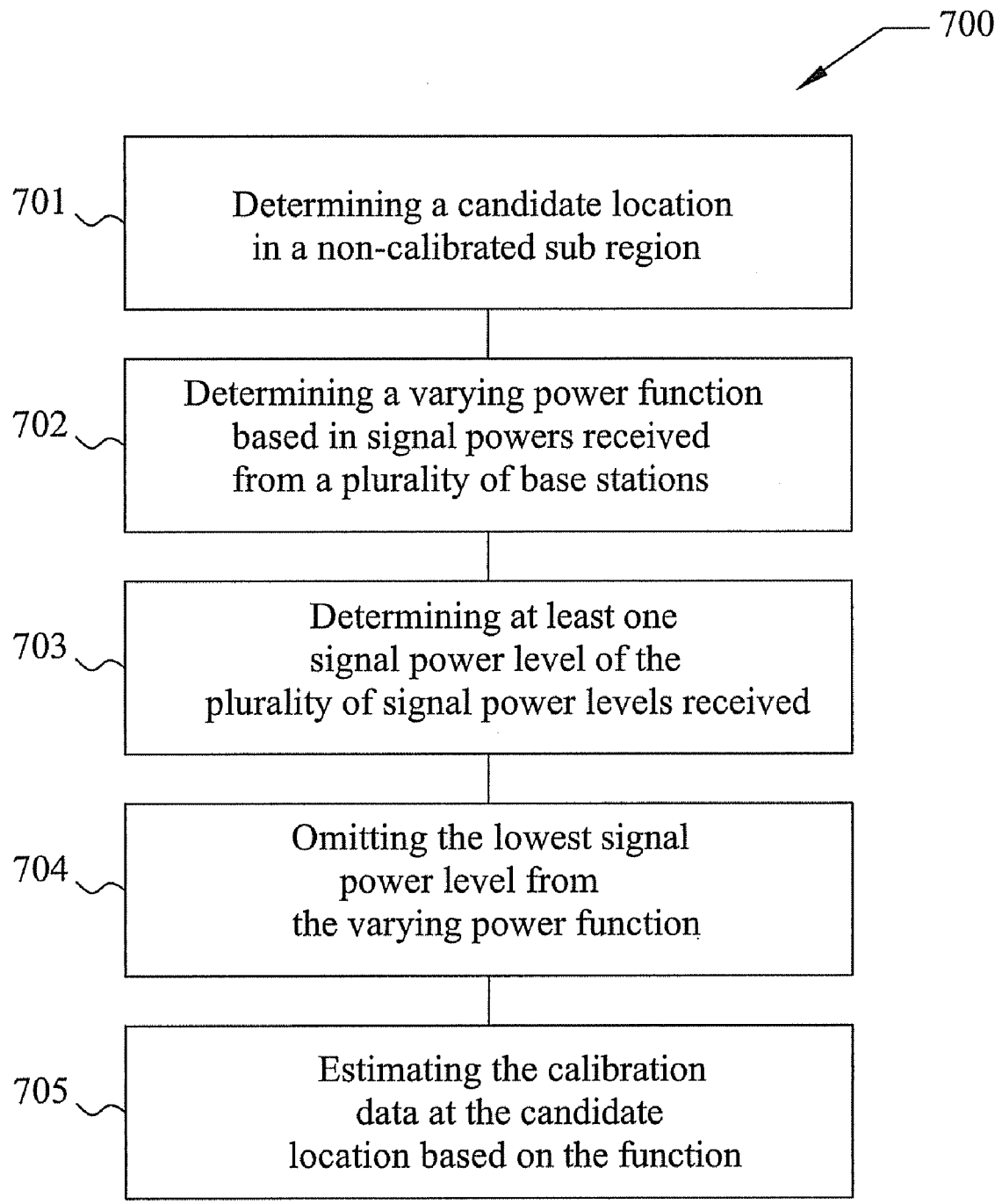
FIG. 7 illustrates a flow diagram according to yet another exemplary embodiment.

FIG. 7 illustrates a flow diagram 700 of another process that may be used to determine the calibration data at a candidate location. A candidate location in a non-calibrated region may be selected (operation 701). A varying power function may be determined based on signal power received from a plurality of base stations at a location in the calibrated region (operation 702). At least one signal power may be determined for the plurality of signal powers received (operation 703). The lowest signal power measured may be omitted from the varying power function (operation 704). The calibration data at the candidate location may then be estimated based on the estimated function (operation 705).

Figure 8:
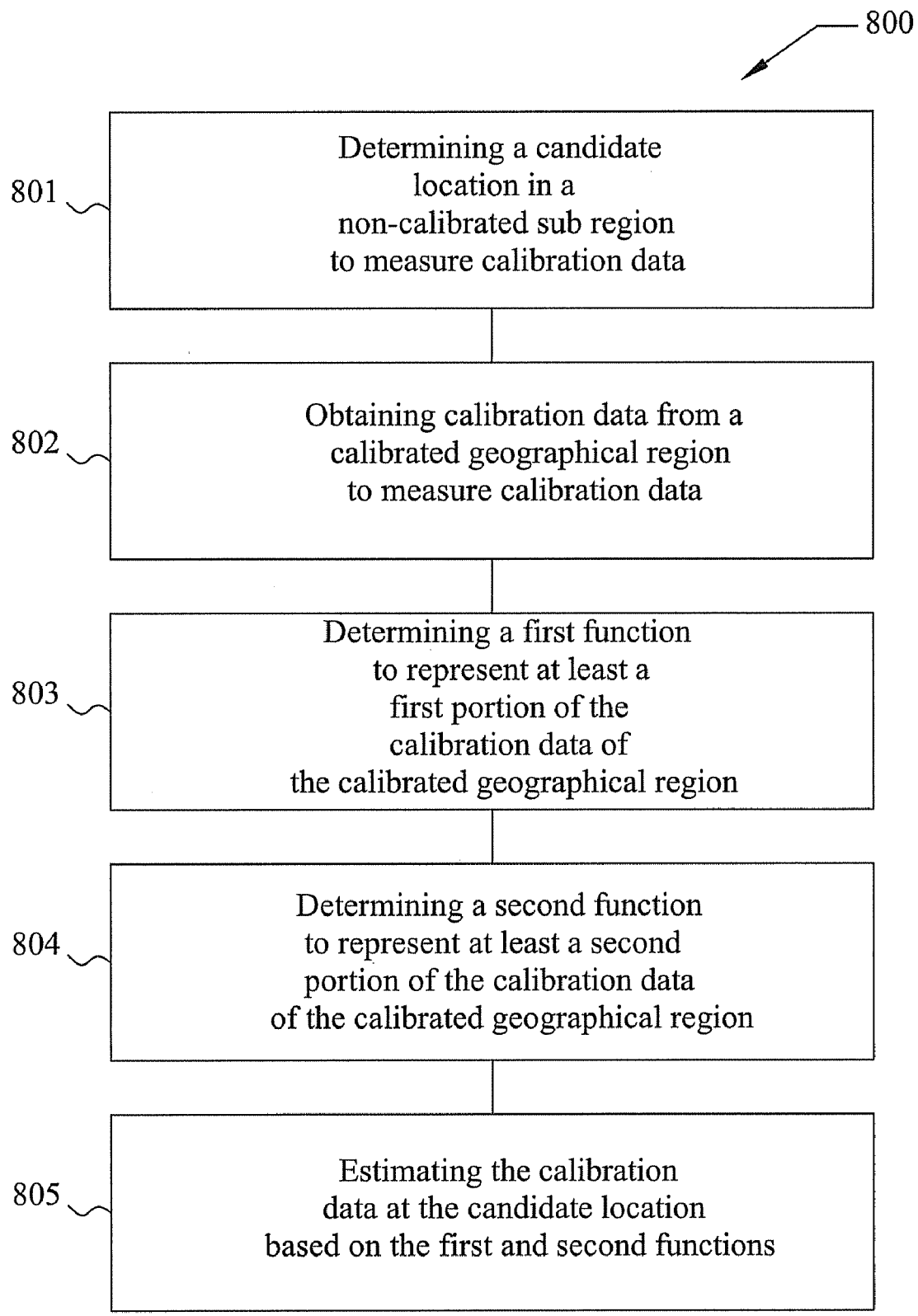
FIG. 8 illustrates a flow diagram according to still yet another exemplary embodiment.

FIG. 8 illustrates a flow diagram 800 of another process that may be used to determine the calibration data at a candidate location. A candidate location in a non-calibrated region may be selected (operation 801). A previously calibrated region may be selected (operation 802). A first function may be determined to represent a first portion of the calibration data of the calibrated geographical region (operation 803). A second function may be determined to represent a portion of the calibration data at the calibrated geographical region (operation 804). The calibration data at the candidate location may then be estimated based on the first and second functions (operation 805).

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. A method of determining calibration data of a candidate location in a non-calibrated sub-region of a calibrated geographical region the method comprising:
    determining the candidate location in the non-calibrated sub-region to obtain calibration data;
    obtaining calibration data by a calibration data collection device for the calibrated geographical region within communication range of the candidate location;
    determining a function to represent at least a portion of the calibration data of the calibrated geographical region; and
    estimating the calibration data at the candidate location based on the function,
    wherein the function represents a varying power level of one or more signals received from at least one neighboring base station over a distance beginning at a first location adjacent to the candidate location and within the calibrated geographical region, and ending at a second location different from the first location and also within the calibrated geographical region.

2. The method of claim 1, wherein the function represents a power level of one or more signals received from at least one neighboring base station.

3. The method of claim 1, wherein the function represents a power level of one or more signals received from at least three neighboring base stations.

4. The method of claim 1, wherein the function represents timing information of one or more signals received from at least one neighboring base stations.

5. The method of claim 1, wherein the function is used to perform an extrapolation function to estimate the candidate location.

6. The method of claim 1, wherein the distance between the first and second location passes into the non-calibrated region.

7. A method of determining calibration data of a candidate location in a non-calibrated sub-region of a calibrated geographical region the method comprising:
    determining the candidate location in the non-calibrated sub-region to estimate calibration data;
    determining a varying power function of signal power received from at least one neighboring base station to represent calibration data of at least a portion of the calibrated geographical region adjacent to the non-calibrated sub-region; and
    estimating the calibration data at the candidate location based on the function,
    wherein the varying power function represents the signal power level over a distance, and where the signal power level decreases as the distance away from the neighboring base station increases.

8. The method of claim 7, wherein the varying power function represents the signal power level over a distance along a vehicle accessible road.

9. A method of determining calibration data of a candidate location in a non-calibrated sub-region of a calibrated geographic region, the method comprising:
    determining the candidate location in the non-calibrated sub-region to estimate calibration data;
    determining a varying power function of signal powers received from a plurality of neighboring base stations to represent calibration data of at least a portion of the calibrated geographical region adjacent to the non-calibrated sub-region;
    determining at least one lowest signal power level of the plurality of signal power levels received;
    omitting the signal power of the base station that transmitted the lowest signal power level from the varying power function; and
    estimating the calibration data at the candidate location based on the function,
    wherein the varying power function represents the signal power level over a distance, and where the signal power level decreases as the distance away from the neighboring base station increases.

10. A method of determining calibration data of a candidate location in a non-calibrated sub-region in of a calibrated geographic region, the method comprising:
    determining the candidate location in the non-calibrated sub-region to estimate calibration data;
    obtaining calibration data by a calibration data collection device for the calibrated geographical region within communication range of the candidate location;
    determining a first function to represent at least a first portion of the calibration data of the calibrated geographical region;
    determining a second function to represent at least a second portion of the calibration data of the calibrated geographical region, where the second portion is different from the first portion; and
    estimating the calibration data at the candidate location based on the first and second functions,
    wherein the first function represents a first signal power level over a first distance along a first vehicle accessible road, and the second function represents a second signal power level over a second distance along a second vehicle accessible road.

11. The method of claim 10, wherein the first and second functions are used to perform an interpolation function to estimate the calibration data of the candidate location.

12. The method of claim 10, wherein at least one of the first and second functions are used to perform an extrapolation function to estimate the calibration of candidate location.

13. The method of claim 10, wherein the first and second roads intersect at a point contiguous with the candidate location.

14. The method of claim 10, wherein the first portion of calibration data is Timing Advance.

15. The method of claim 14, wherein the second portion is Timing Advance.

16. A calibration data collection and measurement system comprising:
    a calibration data collection device to collect and store calibration data within a first portion of a geographical region;
    a computing device to locate a candidate location within a non-calibrated portion of the geographical region, to select a previously calibrated geographical region within communication range of the candidate location, to determine a function to represent at least a portion of the calibration data of the calibrated geographical region, and to estimate the calibration data at the candidate location based on the function,
    wherein the function represents a varying power level of one or more signals received from at least one neighboring base station over a distance beginning at a first location adjacent to the candidate location and within the calibrated geographical region, and ending at a second location different from the first location and also within the calibrated geographical region.

17. The system of claim 16, wherein the calibration data collection device is attached to a motor vehicle.

* * * * *